United States Patent
Gehtman et al.

(10) Patent No.: US 12,445,452 B2
(45) Date of Patent: Oct. 14, 2025

(54) REMOTE ACCESS CONTROL USING VALIDATION OF PHYSICAL LOCATION OF REMOTE USER

(71) Applicant: Dell Products L.P., Round Rock, TX (US)

(72) Inventors: Yevgeni Gehtman, Modi'in (IL); Tomer Shachar, Beer-Sheva (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/081,758

(22) Filed: Dec. 15, 2022

(65) Prior Publication Data

US 2024/0205232 A1     Jun. 20, 2024

(51) Int. Cl.
| | |
|---|---|
| H04L 9/40 | (2022.01) |
| H04L 41/50 | (2022.01) |
| H04L 67/61 | (2022.01) |
| H04W 12/64 | (2021.01) |
| H04W 12/73 | (2021.01) |

(52) U.S. Cl.
CPC ............ H04L 63/105 (2013.01); H04L 41/50 (2013.01); H04L 63/107 (2013.01); H04L 67/61 (2022.05); H04W 12/64 (2021.01); H04W 12/73 (2021.01)

(58) Field of Classification Search
CPC ....... H04L 63/105; H04L 67/61; H04L 41/50; H04L 63/107; H04W 12/73; H04W 12/64
See application file for complete search history.

(56) References Cited

U.S. PATENT DOCUMENTS

| | | | |
|---|---|---|---|
| 10,402,546 B1 * | 9/2019 | Qureshi | ................ H04L 9/0822 |
| 2018/0032759 A1 * | 2/2018 | Radocchia | .......... G06F 21/6254 |
| 2021/0058383 A1 * | 2/2021 | Colon | ..................... H04W 4/80 |
| 2021/0377222 A1 * | 12/2021 | Sharma | ................... H04L 9/006 |

(Continued)

FOREIGN PATENT DOCUMENTS

WO     WO-2004099914 A2 *    11/2004    ......... G06F 21/6245

OTHER PUBLICATIONS

Gittlen, Sandra; "Ultimate Guide to Secure Remote Access"; Published Nov. 24, 2021; downloaded on Dec. 13, 2022.

(Continued)

*Primary Examiner* — Glenton B Burgess
*Assistant Examiner* — Jihad K Boustany
(74) *Attorney, Agent, or Firm* — Ryan, Mason & Lewis, LLP

(57) ABSTRACT

Techniques are provided for remote access control using validation of a physical location of a remote user. One method comprises obtaining a request from a user associated with a first entity to remotely access a network associated with a second entity; and, in response to the request, performing the following steps: determining if a location of the user is at least partially within at least one designated location associated with the first entity; and initiating a granting of the request to remotely access the network in response to a result of the determining. An evaluation of whether the user is connected to a network of the first entity may also be performed in response to the request from the user to remotely access the network. The request to remotely access the network may be in connection with the user remotely maintaining a product of the second entity.

20 Claims, 5 Drawing Sheets

(56) References Cited

U.S. PATENT DOCUMENTS

2022/0417114 A1* 12/2022 Reineke .............. H04L 41/5006
2024/0007461 A1*  1/2024 Reed ................... H04L 63/1441

OTHER PUBLICATIONS

Beyond Trust, Remote Access Control Strategies for the Work-from-Anywhere (WFA) Era; Sep. 16, 2021; downloaded on Dec. 13, 2022.

Bertino et al.; "Location-Based Access Control Systems for Mobile Users—Concepts and Research Directions"; SPRINGL, Nov. 1, 2011.

* cited by examiner

REMOTE ACCESS CONTROL USING VALIDATION OF PHYSICAL LOCATION OF REMOTE USER

FIELD

The field relates generally to information processing systems, and more particularly to the protection of such information processing systems.

BACKGROUND

Computing devices are typically configured to incorporate security functionality to protect such devices from malicious activity. For example, it may be desirable to prevent suspicious computer operations unless they are implemented by a legitimate and authorized user. Role-based access control (RBAC) techniques may be employed to restrict access to devices or network resources based on the roles of individual users within an organization. RBAC techniques typically allow users to access only the information and other resources needed for their jobs and prevent users from accessing additional resources. RBAC techniques, however, are vulnerable to various types of attacks, such as password theft and/or session hijacking.

A need exists for improved techniques for protecting devices from suspicious and/or unauthorized computer operations.

SUMMARY

In one embodiment, a method comprises obtaining a request from a user associated with a first entity to remotely access a network associated with a second entity; and, in response to the request from the user to remotely access the network, performing the following steps: determining if a location of the user is at least partially within at least one designated location associated with the first entity; and initiating a granting of the request to remotely access the network in response to a result of the determining.

In some embodiments, in response to the request from the user to remotely access the network, a multi-factor authentication of the user is performed. In addition, an evaluation of whether the user is connected to a network of the first entity can be performed in response to the request from the user to remotely access the network.

In one or more embodiments, the request to remotely access the network is in connection with the user remotely maintaining one or more products of the second entity. The request to remotely access the network may be performed in connection with a service level agreement between the first entity and the second entity for the first entity to remotely maintain one or more products of the second entity.

In at least one embodiment, the determining if the location of the user is at least partially within the at least one designated location associated with the first entity comprises evaluating one or more of: (i) a location of one or more signals of a device of the user; (ii) one or more facility access records of the first entity to determine if the user entered the at least one designated location; and (iii) a biometric signal obtained from the user at the at least one designated location. The one or more facility access records of the first entity may be evaluated to determine if, at a time of the request from the user to remotely access the network, a most recent location accessed by the user using an employee credential was the at least one designated location.

Other illustrative embodiments include, without limitation, apparatus, systems, methods and computer program products comprising processor-readable storage media.

DETAILED DESCRIPTION

Figure 1:
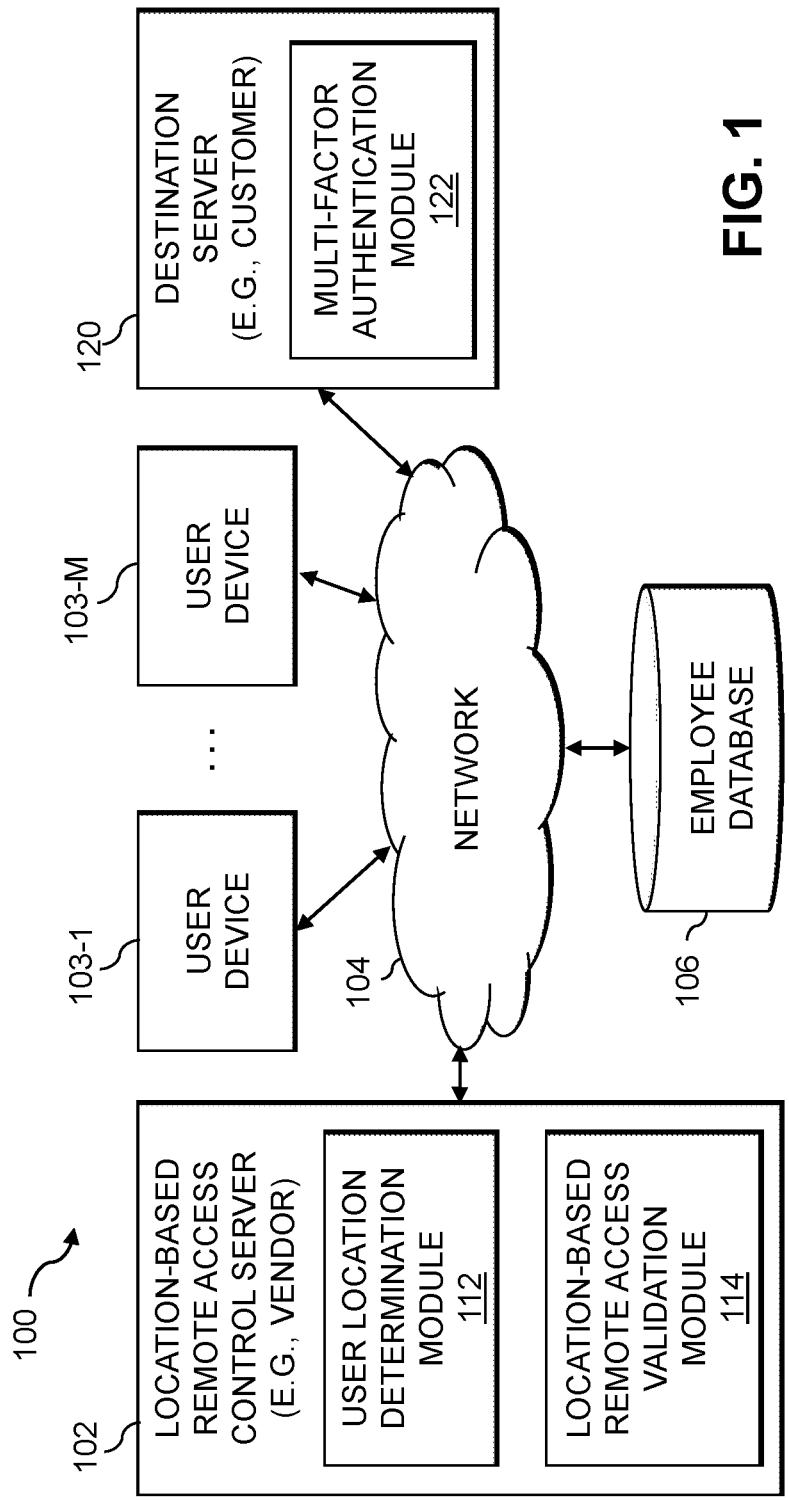
FIG. 1 illustrates an information processing system configured for location-based remote access validation in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for remote access control using validation of a physical location of a remote user.

A service level agreement (SLA) often specifies one or more compliance requirements between a vendor of one or more products and a customer. Remote serviceability arrangements, for example, typically allow a vendor to remotely maintain products of a customer while also ensuring that the network security of the customer is not impaired. The SLA may thus further specify one or more requirements that the vendor must adhere to while performing such remote maintenance tasks for the customer.

A vendor may thus be required to adhere to one or more customer requirements while performing remote maintenance tasks for the customer. Thus, to preserve the security of the network of the customer, for example, a secured connection may be required, as well as a validation procedure to validate the service personnel performing one or more remote maintenance tasks. If a laptop or another device of the service personnel is lost or stolen, for example, there is a risk that the device may be used by a malicious actor to remotely access the network of the customer.

In one or more embodiments, a multi-factor authentication (e.g., a second factor authentication) is performed of service personnel in response to a request by the service personnel to remotely access a facility of a customer or another third party. In this manner, the service personnel having valid credentials at the time of the access may not be sufficient to obtain access to the remote location. Rather, the service personnel may need to satisfy a multi-factor authentication in addition to, or as an alternative to, presenting valid credentials. The multi-factor authentication may comprise a validation procedure to verify a current location of the service personnel (for example, using information technology (IT) or other records of the vendor to validate that the service personnel is performing the remote maintenance work from a designated location (e.g., a secure location, such as an approved facility of the vendor) and/or using a secure connection, before providing the requested remote access to the customer facility.

While one or more embodiments of the present disclosure are described in the context of service personnel of a vendor attempting to remotely access a customer facility, the disclosed techniques for location-based remote access validation may be employed in any environment where it is desirable to verify the location of a source user before providing access to a network of a third party.

Among other benefits, the disclosed techniques for remote access control using validation of a physical location of a remote user can detect and mitigate unauthorized and/or malicious attempts to access a destination network or another resource connected to the network (such as devices and/or data of a given organization), such as attempts to: (i) perform an unauthorized encryption or deletion of one or more files accessible via the destination network; (ii) execute sensitive operations (or other designated operations) that may impair the operation of one or more devices or data accessible via the destination network; and/or (iii) suspend operation of one or more devices accessible via the destination network.

FIG. 1 shows a computer network (also referred to herein as an information processing system) 100 configured in accordance with an illustrative embodiment. The computer network 100 comprises a plurality of user devices 103-1 through 103-M, collectively referred to herein as user devices 103. The user devices 103 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is one or more location-based remote access control servers 102, one or more destination servers 120 and one or more employee databases 106, discussed below.

The location-based remote access control servers 102 may be associated with a vendor, for example, and the destination servers 120 may be associated with a customer of the vendor, for example. The location-based remote access control servers 102 and/or destination servers 120 may comprise edge devices, host devices and other devices. The user devices 103 may comprise, for example, host devices and/or devices such as mobile telephones, laptop computers, tablet computers, desktop computers or other types of computing devices. Such devices are examples of what are more generally referred to herein as "processing devices" which may be protected using the disclosed remote access control techniques. Some of these processing devices are also generally referred to herein as "computers." The user devices 103 may comprise a network client that includes networking capabilities such as ethernet, Wi-Fi, etc. When the user devices 103 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices.

The user devices 103 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

It is to be appreciated that the term "user" in this context and elsewhere herein is intended to be broadly construed so as to encompass, for example, human, hardware, software or firmware entities (including services), as well as various combinations of such entities. Compute and/or storage services may be provided for users under a Platform-as-a-Service (PaaS) model, a Storage-as-a-Service (STaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

As shown in FIG. 1, an exemplary location-based remote access control server 102 may comprise a user location determination module 112 and a location-based remote access validation module 114. In the example of FIG. 1, the location-based remote access control server 102 of a given vendor performs the disclosed location-based remote access validation of an employee of the given vendor and provides the result to a customer of the given vendor.

In some embodiments, the user location determination module 112 automatically determines the current location of service personnel or another user attempting to access a destination server 120 (such as a server of a customer or a third party, relative to the provider of the location-based remote access control server 102), as discussed further below in conjunction with FIGS. 2 and 3. The location-based remote access validation module 114 automatically evaluates the determined location of the service personnel or other user relative to one or more specified location constraints, as discussed further below in conjunction with FIGS. 2 and 3. In addition, the location-based remote access validation module 114 may interact with a multi-factor authentication module 122, discussed further below, for example, of the destination server 120 to receive and implement user physical location constraints.

It is to be appreciated that this particular arrangement of modules 112, 114 illustrated in the location-based remote access control server 102 of the FIG. 1 embodiment is presented by way of example only, and alternative arrangements can be used in other embodiments. For example, the functionality associated with modules 112, 114 in other embodiments can be combined into a single element, or separated across a larger number of elements. As another example, multiple distinct processors can be used to implement different ones of modules 112 and 114 or portions thereof.

At least portions of modules 112, 114 may be implemented at least in part in the form of software that is stored in memory and executed by a processor. An exemplary process utilizing modules 112, 114 of the location-based remote access control server 102 in computer network 100 will be described in more detail with reference to FIGS. 2 and 3.

Other location-based remote access control servers 102 (not shown in FIG. 1) are assumed to be configured in a manner similar to that shown for location-based remote access control server 102 in the figure.

The destination server 120 may be implemented, for example, on the cloud, such as a private cloud, or on the premises of an enterprise or another entity, as discussed further below. In some embodiments, the destination server 120, or portions thereof, may be implemented as part of a host device. The destination server 120 may provide access, for example, to another network of a second entity or another third party (not shown in FIG. 1). The destination server 120 may manage and update one or more physical location constraints, for example, consistent with the policies of a given organization and/or the expected locations of users (e.g., service personnel) of one or more location-based remote access control servers 102. As also depicted in FIG. 1, the destination server 120 further comprises a multi-factor authentication module 122. In some embodiments, the multi-factor authentication module 122 performs a multi-factor authentication of one or more users (e.g., service personnel) and interacts with, for example, the location-based remote access validation module 114 of one or more location-based remote access control servers 102 to provide new and/or updated physical location constraints to be monitored by the location-based remote access validation module 114 of a respective location-based remote access control server 102. In other embodiments, one or more of the location-based remote access control servers 102 may include the multi-factor authentication module 122 instead of, or in addition to, the destination server 120 (e.g., to self-manage the physical location constraint information).

It is to be appreciated that this particular arrangement of the multi-factor authentication module 122 illustrated in the destination server 120 of the FIG. 1 embodiment is presented by way of example only, and alternative arrangements can be used in other embodiments. For example, the functionality associated with multi-factor authentication module 122 in other embodiments can include additional modules, or be separated across a larger number of modules. As another example, multiple distinct processors can be used to implement different portions of multi-factor authentication module 122.

At least portions of multi-factor authentication module 122 may be implemented at least in part in the form of software that is stored in memory and executed by a processor. An exemplary process utilizing multi-factor authentication module 122 of an example destination server 120 in computer network 100 will be described in more detail with reference to the flow diagrams of, for example, FIGS. 2 and 3.

Additionally, the location-based remote access control server 102 and/or the destination server 120 can have an associated employee database 106 configured to store, for example, a set of physical location constraint policies, server-specific expected physical location profiles and/or information related to various devices, such as one or more destination servers 120, such as remote device locations, network address assignments and performance data. The set of physical location constraint policies may specify one or more permitted source locations for service personnel attempting to access the destination server 120, for example. In addition, the employee database 106 may comprise information related to employees, such as service personnel (for example, access control records indicating accessed locations of a given employee or network resources employed by the given employee). The accessed locations may be obtained, for example, by recording locations accessed using credentials and/or biometrics of the given employee (e.g., by swiping an employer-issued identity card). The network resources employed by the given employee may be obtained, for example, by recording log in attempts (or other IT data) of the given employee using network credentials.

The employee database 106 may be maintained, for example, by the location-based remote access control server 102 and/or the destination server 120.

At least portions of the employee database 106 configured to store the physical location constraint policies, for example, may be implemented in some embodiments using a vault or another protected storage provided by an operating system of one or more of the location-based remote access control servers 102, user devices 103 and/or destination servers 120. In some embodiments, any changes to data stored in the protected storage requires a designated level of approval.

The employee database 106 in the present embodiment is implemented using one or more storage systems associated with the destination server 120. Such storage systems can comprise any of a variety of different types of storage such as, network-attached storage (NAS), storage area networks (SANs), direct-attached storage (DAS) and distributed DAS, as well as combinations of these and other storage types, including software-defined storage.

The one or more location-based remote access control servers 102, user devices 103 and/or destination servers 120 may be implemented on a common processing platform, or on separate processing platforms. The one or more location-based remote access control servers 102 and user devices 103 may be configured to interact over the network 104 in at least some embodiments with the destination server 120.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 103 and the storage system to reside in different data centers. Numerous other distributed implementations of the host devices and the storage system are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the one or more location-based remote access control servers 102, user devices 103 and/or destination servers 120 can be one or more input-output devices (not shown), which illustratively comprise keyboards, displays or other types of input-output devices in any combination. Such input-output devices can be used, for example, to support one or more user interfaces to the destination server 120, as well as to support communication between the destination server 120 and other related systems and devices not explicitly shown.

The one or more location-based remote access control servers 102, user devices 103 and/or destination servers 120 in the FIG. 1 embodiment are assumed to be implemented using at least one processing device. Each such processing device generally comprises at least one processor and an associated memory, and implements one or more functional modules for controlling certain features of the respective device.

More particularly, the one or more location-based remote access control servers 102, user devices 103 and/or destination servers 120 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the one or more location-based remote access control servers 102, user devices 103 and/or destination servers 120 to communicate in some embodiments over the network 104 with each other (as well as one or more other networked devices), and illustratively comprises one or more conventional transceivers.

It is to be understood that the particular set of elements shown in FIG. 1 for multi-party remote access control using validation of a physical location of a remote user is presented by way of illustrative example only, and in other embodiments additional or alternative elements may be used. Thus, another embodiment includes additional or alternative systems, devices and other network entities, as well as different arrangements of modules and other components.

Figure 2:
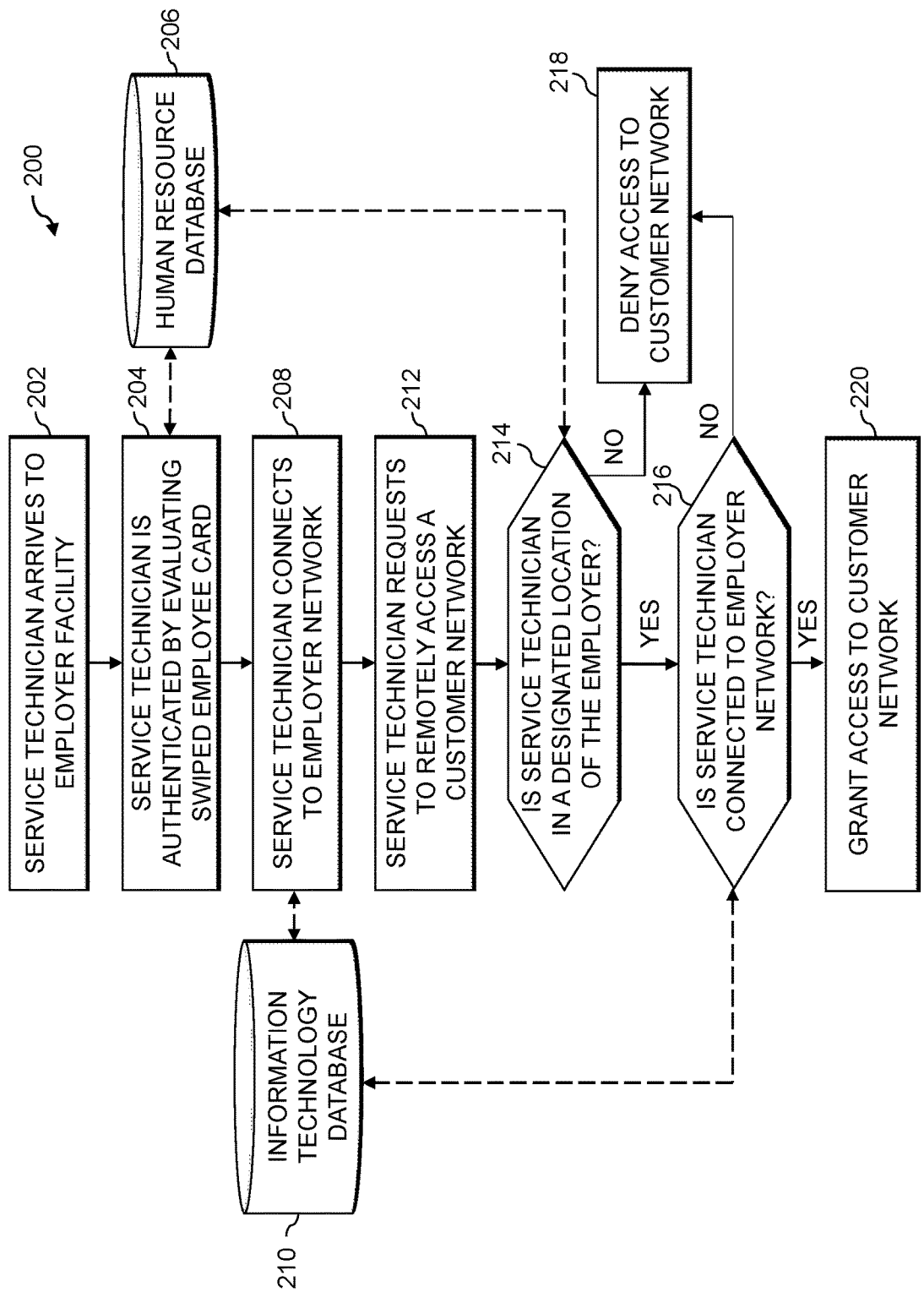
FIGS. 2 and 3 are flow charts illustrating exemplary implementations of processes for remote access control using validation of a physical location of a remote user in accordance with illustrative embodiments.

FIG. 2 is a flow chart illustrating an exemplary implementation of a process 200 for location-based remote access validation, according to one embodiment of the disclosure. In the example of FIG. 2, the process 200 is performed by the user location determination module 112 and/or the location-based remote access validation module 114 of the location-based remote access control server 102 of FIG. 1 in connection with a service technician attempting to connect to a customer network.

A service technician arrives to an employer facility (of the service technician) in step 202. In step 204, the service technician is authenticated by evaluating a swiped employee card (or another employee credential), for example. A human resources database 206 may be accessed to validate the swiped employee card (or other employee credential) before the service technician is permitted to enter the employer facility. In addition, the human resources database 206 may be accessed to create a record of the latest location of the service technician.

The service technician then attempts to connect to a network of the employer (e.g., a virtual private network of the employer) in step 208. An IT database 210 (e.g., network access log records) may be accessed to validate the network credentials (or other credentials) of the service technician before the service technician is permitted to access the network of the employer. In addition, the IT database 210 may be accessed to create a record of the latest network access of the service technician.

In step 212, the service technician requests to remotely access a customer network, for example. The process 200 performs a test in step 214 to determine if the service technician is in a designated location of the employer (e.g., was there a successful employee card swipe by the service technician for the designated location), for example, by accessing the human resources database 206. For example, the test performed in step 214 may determine if the service technician is in the designated location of the employer, such as a specific employer building or a specific portion (e.g., a laboratory or data center) of a specific employer building.

If it is determined in step 214 that the service technician is not in a designated location of the employer, then program control proceeds to step 218, discussed below. If it is determined in step 214 that the service technician is in a designated location of the employer, then the process 200 performs a further test in step 216 to determine if the service technician is connected to the employer network (e.g., the VPN of the employer), for example, by accessing the IT database 210.

If it is determined in step 216 that the service technician is not connected to the employer network (and/or if the service technician is not in a designated location of the employer), then the service technician is denied access to the requested customer network in step 218.

If it is determined in step 216 that the service technician is connected to the employer network (and that the service technician was determined in step 214 to be in a designated location of the employer), then the service technician is granted access to the requested customer network in step 220.

Figure 3:
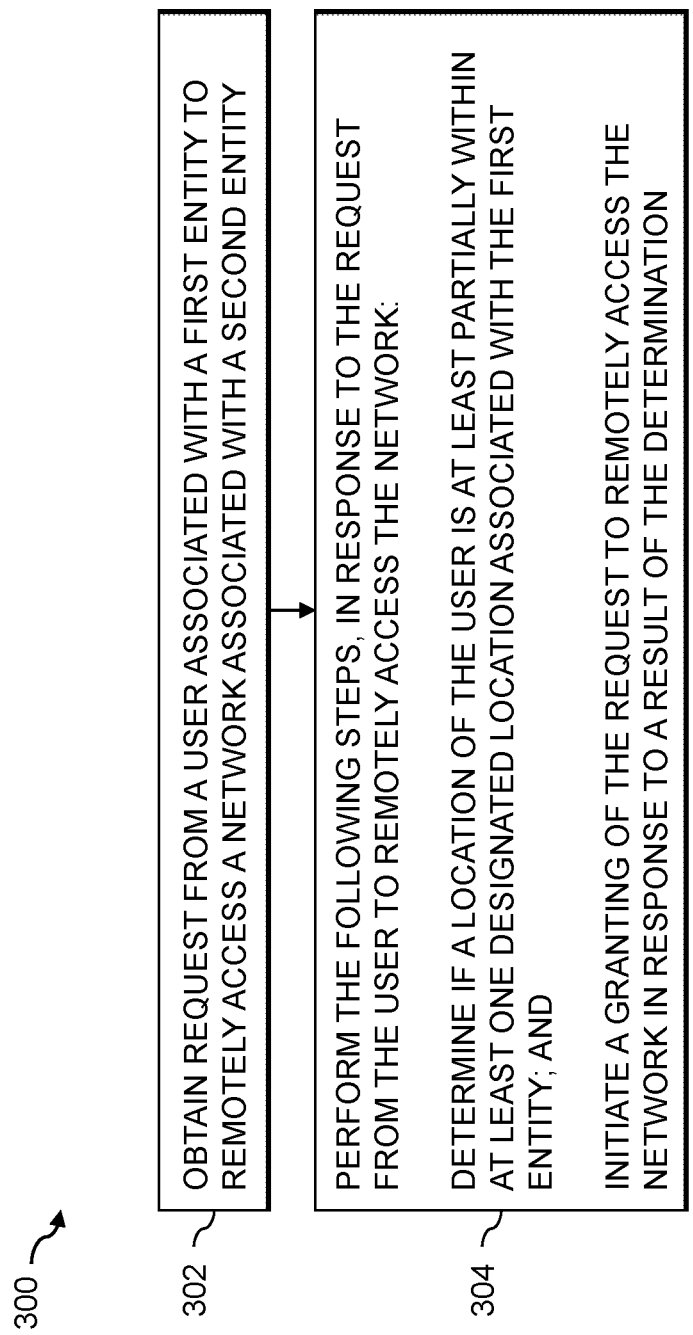

FIG. 3 is a flow chart illustrating an exemplary implementation of a process 300 for multi-entity remote access control using validation of a physical location of a remote user, according to one embodiment of the disclosure. The process 300 may be performed, for example, by the user location determination module 112 and the location-based remote access validation module 114 of the location-based remote access control server 102 of FIG. 1. In the example of FIG. 3, the process 300 obtains a request from a user associated with a first entity in step 302 to remotely access a network associated with a second entity.

In step 304, in response to the request from the user to remotely access the network, the process 300 performs the following steps: determine if a location of the user is at least partially within at least one designated location associated with the first entity; and initiate a granting of the request to remotely access the network in response to a result of the determination.

In some embodiments, a multi-factor authentication of the user is performed, in response to the request from the user to remotely access the network. In addition, the process 300 may evaluate whether the user is connected to a network of the first entity, in response to the request from the user to remotely access the network.

In one or more embodiments, the request to remotely access the network is in connection with the user remotely maintaining one or more products of the second entity. The request to remotely access the network may be performed in connection with a service level agreement between the first entity and the second entity for the first entity to remotely maintain one or more products of the second entity.

In at least one embodiment, the determining if the location of the user is at least partially within the at least one designated location associated with the first entity comprises evaluating one or more of: (i) a location of one or more signals of a device of the user; (ii) one or more facility access records of the first entity to determine if the user entered the at least one designated location; and (iii) a biometric signal obtained from the user at the at least one designated location. The one or more facility access records of the first entity may be evaluated to determine if, at a time of the request from the user to remotely access the network, a most recent location accessed by the user using an employee credential was the at least one designated location.

The particular processing operations and other network functionality described in conjunction with FIGS. 2 and 3, for example, are presented by way of illustrative example only, and should not be construed as limiting the scope of the disclosure in any way. Alternative embodiments can use other types of processing operations for multi-party remote access control using validation of a physical location of a remote user. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

The disclosed techniques for location-based remote access validation can be employed, for example, to validate a location of a user, such as a service technician, associated with a given entity (e.g., a vendor), that is attempting to access a network or another resource of another entity, such as a customer of the given entity. The validation may utilize data records of the given entity, such as network utilization logs and/or physical location access logs.

One or more embodiments of the disclosure provide improved methods, apparatus and computer program products for remote access control using validation of a physical location of a remote user. The foregoing applications and associated embodiments should be considered as illustrative only, and numerous other embodiments can be configured using the techniques disclosed herein, in a wide variety of different applications.

It should also be understood that the disclosed location-based remote access validation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed location-based remote access validation techniques may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based multi-party remote access control engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based multi-party remote access control platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. These platforms may also be used to implement at least portions of other information processing systems in other embodiments.

Figure 4:
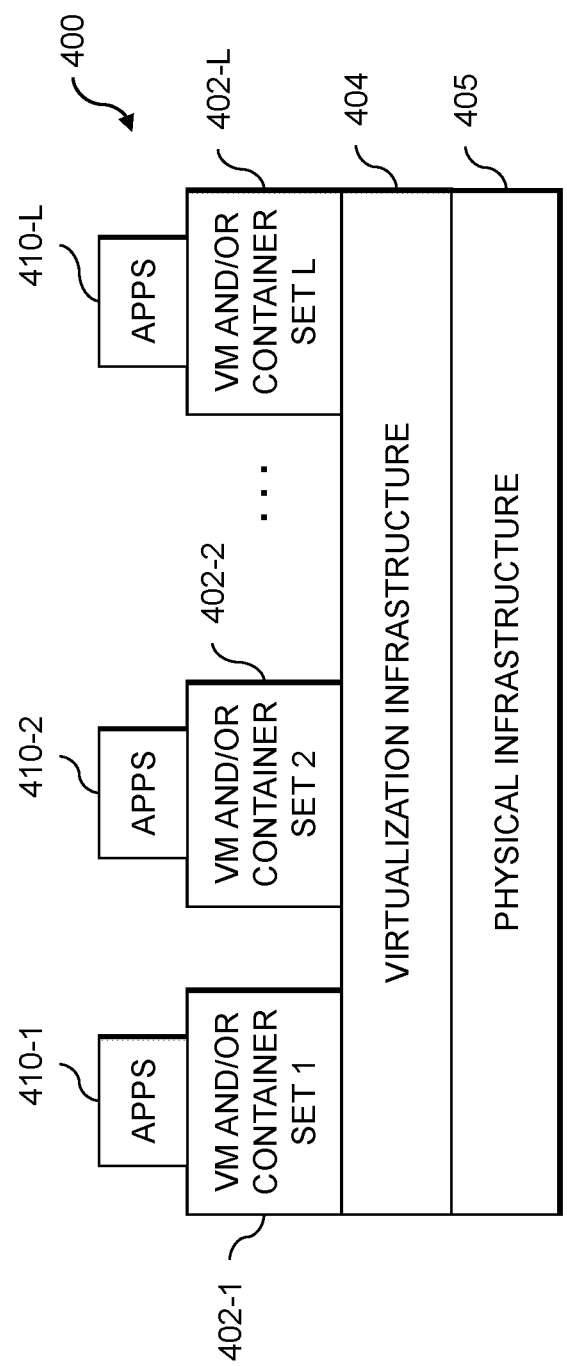
FIG. 4 illustrates an exemplary processing platform that may be used to implement at least a portion of one or more embodiments of the disclosure comprising a cloud infrastructure.

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. Such implementations can provide location-based remote access validation functionality of the type described above for one or more processes running on a given one of the VMs. For example, each of the VMs can implement location-based remote access validation control logic and associated mitigation functionality for one or more processes running on that particular VM.

An example of a hypervisor platform that may be used to implement a hypervisor within the virtualization infrastructure 404 is the VMware® vSphere® which may have an associated virtual infrastructure management system such as the VMware® vCenter™. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system. Such implementations can provide location-based remote access validation and mitigation functionality of the type described above for one or more processes running on different ones of the containers. For example, a container host device supporting multiple containers of one or more container sets can implement one or more instances of location-based remote access validation control logic and associated mitigation functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises at least a portion of the given system and includes a plurality of processing devices, denoted 502-1, 502-2, 502-3, . . . 502-K, which communicate with one another over a network 504. The network 504 may comprise any type of network, such as a WAN, a LAN, a satellite network, a telephone or cable network, a cellular network, a wireless network such as WiFi or WiMAX, or various portions or combinations of these and other types of networks.

The processing device 502-1 in the processing platform 500 comprises a processor 510 coupled to a memory 512.

The processor 510 may comprise a microprocessor, a microcontroller, an ASIC, an FPGA or other type of processing circuitry, as well as portions or combinations of such circuitry elements, and the memory 512, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and the given system may include additional or alternative processing platforms, as well as numerous distinct processing platforms in any combination, with each such platform comprising one or more computers, storage devices or other processing devices.

Figure 5:
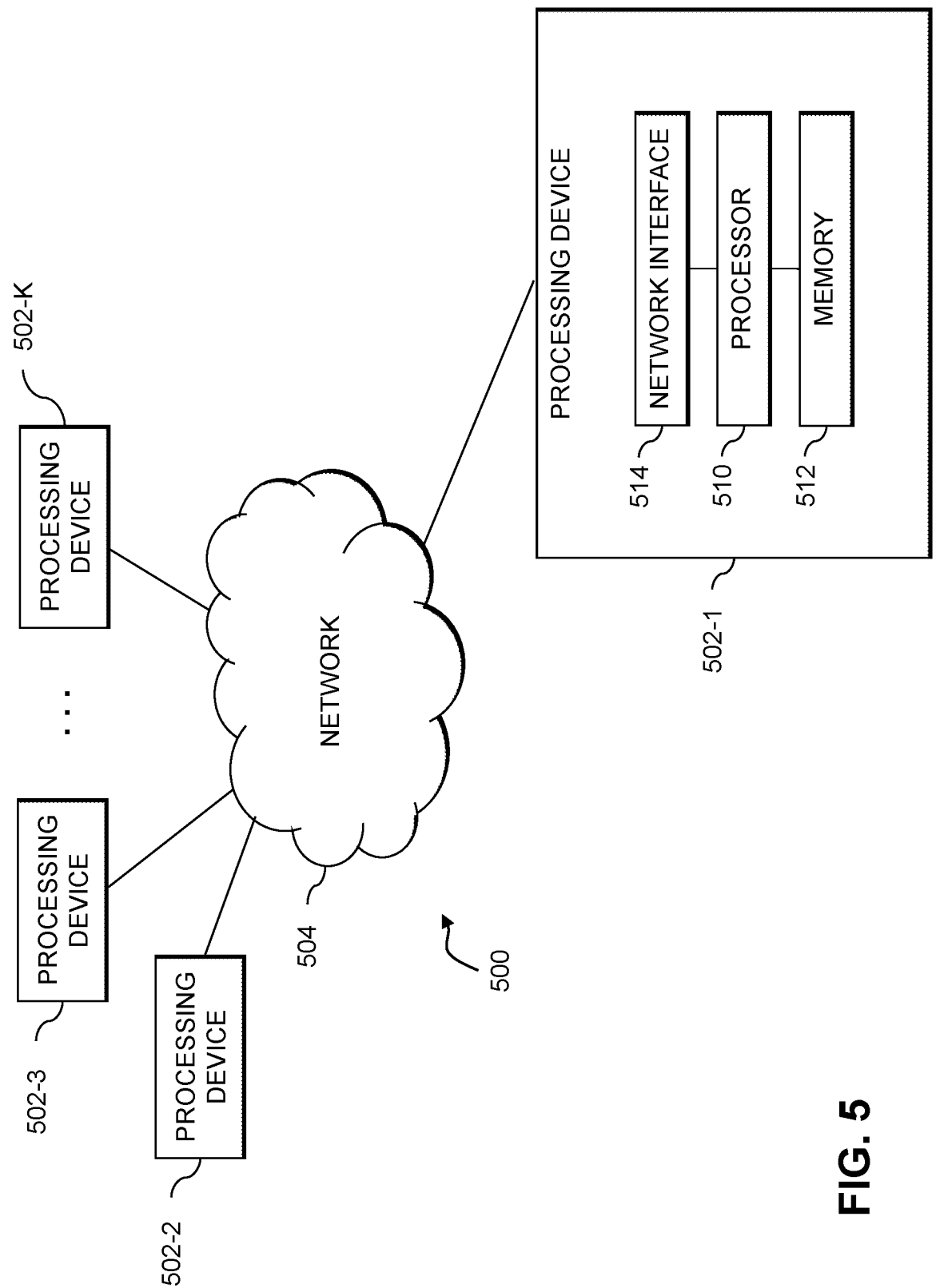
FIG. 5 illustrates another exemplary processing platform that may be used to implement at least a portion of one or more embodiments of the disclosure.

Multiple elements of an information processing system may be collectively implemented on a common processing platform of the type shown in FIG. 4 or 5, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining, by at least one processing device of a first entity, a request from a user associated with the first entity to remotely access a network of a second entity, wherein the first entity is distinct from the second entity, and wherein the request to remotely access the network is in connection with the user remotely maintaining one or more products of the second entity in connection with at least one remote service agreement between the first entity and the second entity; and
    in response to the request from the user to remotely access the network, performing the following steps, based at least in part on at least one user validation procedure of the at least one remote service agreement:
    determining, by the at least one processing device of the first entity, if a location of the user is at least partially within at least one designated location of the first entity; and
    initiating, by the at least one processing device of the first entity and in response to determining the location of the user is at least partially within the at least one designated location of the first entity, a granting of the request to remotely access the network of the second entity;
    wherein the at least one processing device comprises a processor coupled to a memory.

2. The method of claim 1, further comprising, in response to the request from the user to remotely access the network, performing a multi-factor authentication of the user.

3. The method of claim 1, further comprising, in response to the request from the user to remotely access the network, evaluating whether the user is connected to a network of the first entity.

4. The method of claim 1, wherein the at least one remote service agreement comprises a service level agreement between the first entity and the second entity for the first entity to remotely maintain one or more products of the second entity.

5. The method of claim 1, wherein the determining if the location of the user is at least partially within the at least one designated location associated with the first entity comprises evaluating one or more of: (i) a location of one or more signals of a device of the user; (ii) one or more facility access records of the first entity to determine if the user entered the at least one designated location; and (iii) a biometric signal obtained from the user at the at least one designated location.

6. The method of claim 5, wherein the one or more facility access records of the first entity are evaluated to determine if, at a time of the request from the user to remotely access the network, a most recent location accessed by the user using an employee credential was the at least one designated location.

7. An apparatus comprising:
    at least one processing device, of a first entity, comprising a processor coupled to a memory;
    the at least one processing device being configured to implement the following steps:
    obtaining, by at least one processing device of a first entity, a request from a user associated with the first entity to remotely access a network of a second entity, wherein the first entity is distinct from the second entity, and wherein the request to remotely access the network is in connection with the user remotely maintaining one or more products of the second entity in connection with at least one remote service agreement between the first entity and the second entity; and
    in response to the request from the user to remotely access the network, performing the following steps, based at least in part on at least one user validation procedure of the at least one remote service agreement:
    determining, by the at least one processing device of the first entity, if a location of the user is at least partially within at least one designated location of the first entity; and
    initiating, by the at least one processing device of the first entity and in response to determining the location of the user is at least partially within the at least one designated location of the first entity, a granting of the request to remotely access the network of the second entity.

8. The apparatus of claim 7, further comprising, in response to the request from the user to remotely access the network, evaluating whether the user is connected to a network of the first entity.

9. The apparatus of claim 7, wherein the at least one remote service agreement comprises a service level agreement between the first entity and the second entity for the first entity to remotely maintain one or more products of the second entity.

10. The apparatus of claim 7, wherein the determining if the location of the user is at least partially within the at least one designated location associated with the first entity comprises evaluating one or more of: (i) a location of one or more signals of a device of the user; (ii) one or more facility access records of the first entity to determine if the user entered the at least one designated location; and (iii) a biometric signal obtained from the user at the at least one designated location.

11. The apparatus of claim 10, wherein the one or more facility access records of the first entity are evaluated to determine if, at a time of the request from the user to remotely access the network, a most recent location accessed by the user using an employee credential was the at least one designated location.

12. A non-transitory processor-readable storage medium having stored therein program code of one or more software programs, wherein the program code when executed by at least one processing device, of a first entity, causes the at least one processing device to perform the following steps:
    obtaining, by at least one processing device of a first entity, a request from a user associated with the first entity to remotely access a network of a second entity, wherein the first entity is distinct from the second entity, and wherein the request to remotely access the network is in connection with the user remotely maintaining one or more products of the second entity in connection with at least one remote service agreement between the first entity and the second entity; and in response to the request from the user to remotely access the network, performing the following steps, based at least in part on at least one user validation procedure of the at least one remote service agreement:

determining, by the at least one processing device of the first entity, if a location of the user is at least partially within at least one designated location of the first entity; and initiating, by the at least one processing device of the first entity and in response to determining the location of the user is at least partially within the at least one designated location of the first entity, a granting of the request to remotely access the network of the second entity.

13. The non-transitory processor-readable storage medium of claim 12, further comprising, in response to the request from the user to remotely access the network, evaluating whether the user is connected to a network of the first entity.

14. The non-transitory processor-readable storage medium of claim 12, wherein the request to remotely access the network is in performed in connection with at least one remote service agreement comprises a service level agreement between the first entity and the second entity for the first entity to remotely maintain one or more products of the second entity.

15. The non-transitory processor-readable storage medium of claim 12, wherein the determining if the location of the user is at least partially within the at least one designated location associated with the first entity comprises evaluating one or more of: (i) a location of one or more signals of a device of the user; (ii) one or more facility access records of the first entity to determine if the user entered the at least one designated location; and (iii) a biometric signal obtained from the user at the at least one designated location.

16. The non-transitory processor-readable storage medium of claim 15, wherein the one or more facility access records of the first entity are evaluated to determine if, at a time of the request from the user to remotely access the network, a most recent location accessed by the user using an employee credential was the at least one designated location.

17. The method of claim 1, wherein the first entity is associated with a vendor and wherein the second entity is associated with a customer of the vendor.

18. The method of claim 4, wherein the service level agreement between the first entity and the second entity specifies one or more requirements that the first entity must adhere to while performing the remote maintenance of the one or more products of the second entity.

19. The apparatus of claim 9, wherein the service level agreement between the first entity and the second entity specifies one or more requirements that the first entity must adhere to while performing the remote maintenance of the one or more products of the second entity.

20. The non-transitory processor-readable storage medium of claim 14, wherein the service level agreement between the first entity and the second entity specifies one or more requirements that the first entity must adhere to while performing the remote maintenance of the one or more products of the second entity.

* * * * *